United States Patent [19]

Sato et al.

[11] 4,101,928
[45] Jul. 18, 1978

[54] COLOR TELEVISION RECEIVER

[75] Inventors: Tadashi Sato, Yono; Masaru Ibuka; Yoshio Ishigaki, both of Tokyo; Hiroshi Sahara, Yokohama, all of Japan

[73] Assignee: Sony Corporation, Tokyo, Japan

[21] Appl. No.: 744,757

[22] Filed: Nov. 24, 1976

[30] Foreign Application Priority Data

Dec. 3, 1975 [JP] Japan ................................. 50-145402

[51] Int. Cl.$^2$ ........................ H04N 9/535; H04N 9/62
[52] U.S. Cl. ......................................... 358/28; 358/10
[58] Field of Search .................................... 358/10, 28

[56] References Cited
U.S. PATENT DOCUMENTS 2,854,505 9/1958 Davis ...................................... 358/10
3,763,310 10/1973 Sagishima et al. ...................... 358/10

Primary Examiner—Robert L. Griffin
Assistant Examiner—Aristotelis M. Psitos
Attorney, Agent, or Firm—Lewis H. Eslinger; Alvin Sinderbrand

[57] ABSTRACT

A color television receiver hue-control system that produces two sets of color-generating signals, one set being differentially controllable and the other not, to produce two kinds of reference color areas on the screen of a color cathode ray tube to be visible simultaneously. The hue of the first reference color in a first area is fixed, and the hue of the second reference color in an adjacent area is varied by the same hue adjustment control as that used to vary the hue in the reproduced television picture. The hue adjustment is achieved by adjusting the control to produce differential modification of the amplitude of one set of color-generating signals, either by direct amplitude modification or by phase shifting a demodulating carrier if the set of color-generating signals is modulated on a carrier, to produce coincidence of the hue of the two reference colors.

7 Claims, 9 Drawing Figures

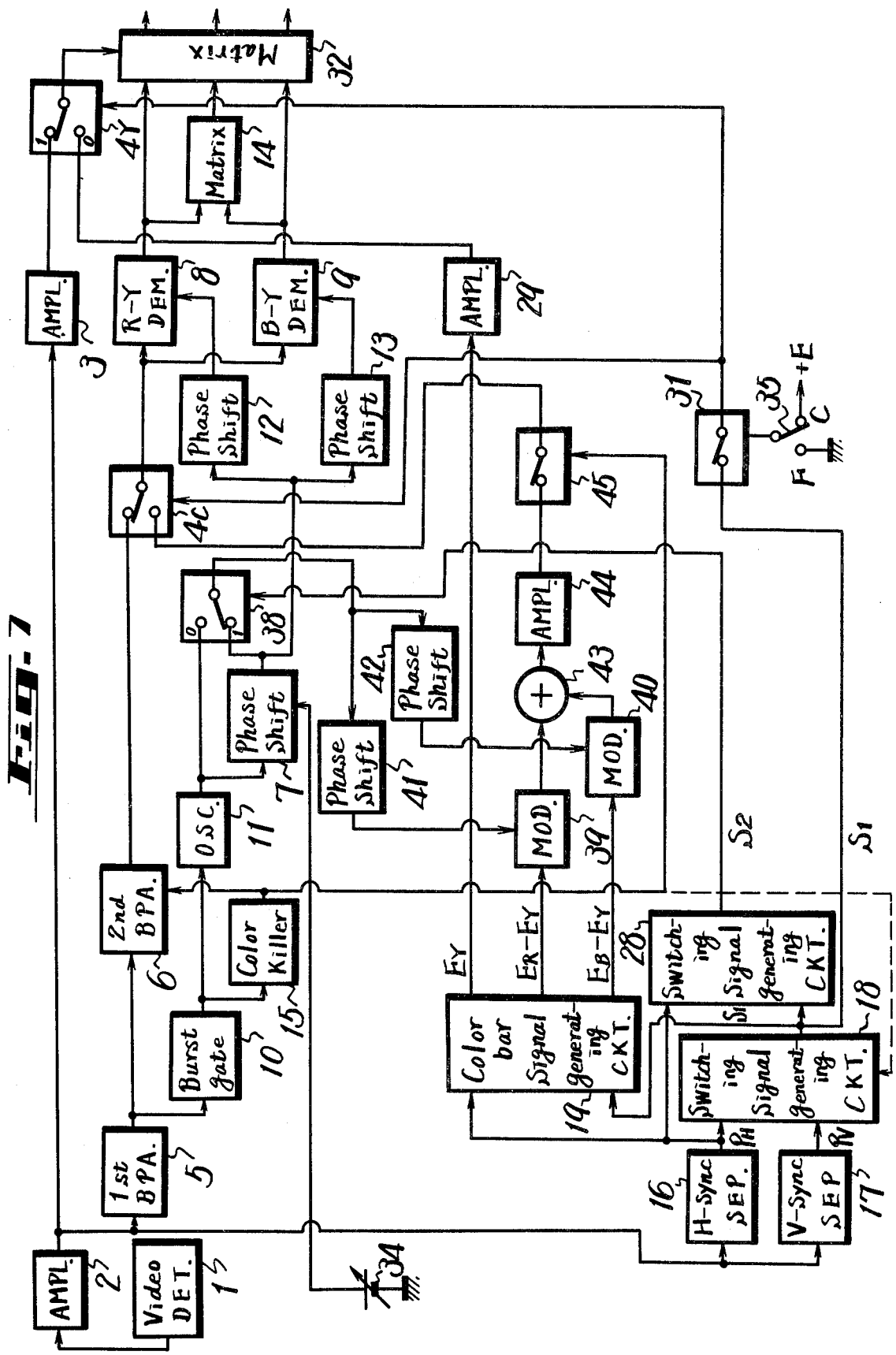

COLOR TELEVISION RECEIVER

BACKGROUND OF THE INVENTION

1. Field of the Invention

This invention relates generally to a color television receiver with a hue adjustment apparatus, and particularly to a color television receiver in which two kinds of reference colors are displayed on the screen to permit a hue adjustment to be carried out easily.

2. Description of the Prior Art

In a color television receiver, it is most difficult to achieve a color adjustment. In general, the hue adjustment of a color television receiver has been carried by making the hue adjustment when the picture of a person appears on the screen of the color television receiver. The hue adjustment is subjectively based on making the color of the person's skin appear to be most natural. With such a method, however, there may occur long program intervals in which no person appears and, therefore, no hue adjustment can be easily made in accordance with such a program on a selected channel.

SUMMARY OF THE INVENTION

It is an object of this invention to provide an improved color television receiver in which hue adjustment is achieved easily.

It is another object of this invention to provide a color television receiver in which two kinds of reference colors can be displayed on the screen thereof.

It is still another object of this invention to provide a reference color generating circuit that produces a fixed hue reference signal and a variable hue reference signal, respectively.

According to one aspect of the invention there is provided a color television receiver which comprises means for producing television pictures on the screen of a cathode ray tube and means for producing two reference color images on one part of the screen when desired. The color-generating means includes means for producing one color area, usually in the form of a multicolor bar, in which all of the colors have a fixed hue, respectively, and means for producing a second reference color having a variable hue on an adjacent part of the cathode ray tube. Control means are provided for varying the hue of the television picture and the second reference color simultaneously.

The other objects, features and advantages of the present invention will become apparent from the following description taken in conjunction with the accompanying drawings.

BRIEF DESCRIPTION OF THE DRAWINGS

FIG. 7 is a block diagram showing another example of a color television receiver hue-control system according to the invention.

DESCRIPTION OF THE PREFERRED EMBODIMENTS

Figure 1:
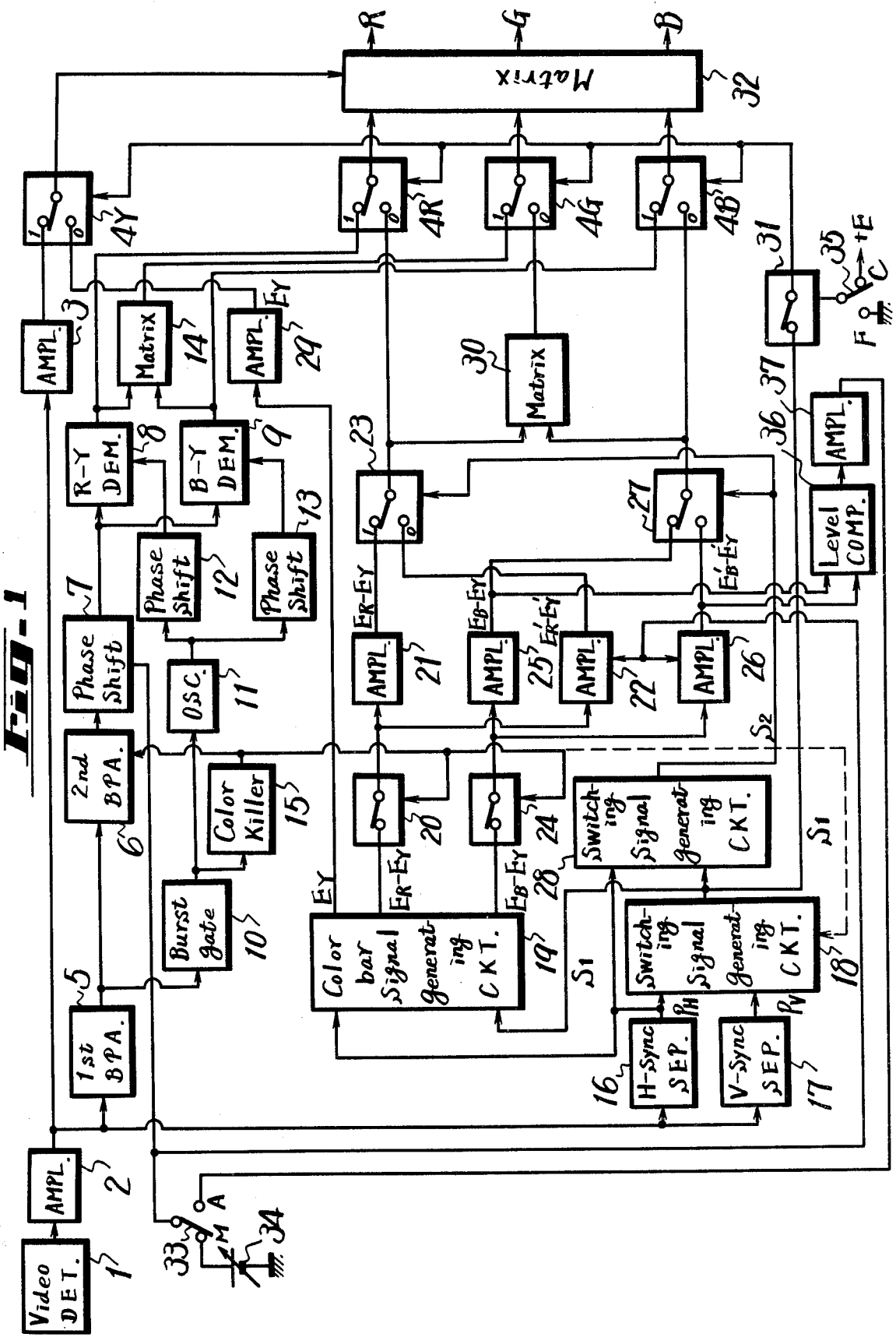
FIG. 1 is a block diagram showing one example of a color television receiver that has a hue-control system according to the invention.

The circuit in FIG. 1 includes a video detector circuit 1, the output signal of which is supplied to first and second video amplifiers 2 and 3 connected in cascade. The luminance signal is derived from the second video amplifier 3 and is fed to one input terminal of a switching circuit 4Y. The output signal from the first video amplifier 2 is fed to cascade-connected first and second band pass amplifiers 5 and 6 from which a chrominance signal is produced. The chrominance signal from the second band pass amplifier 6 is fed through a variable phase shifter 7 to demodulators 8 and 9, respectively, for hue adjustment. The output signal from the first band pass amplifier 5 is fed also to a burst gate circuit 10 which extracts the burst signal. The burst signal from the burst gate circuit 10 is supplied to an oscillator 11 which then produces a continuous wave signal having the same phase as that of the burst signal, and this continuous wave signal is then fed to phase shifters 12 and 13 to demodulate R-Y and B-Y signals that are also fed to the demodulators 8 and 9, respectively. The red color difference signal from the demodulator 8 is fed to one input terminal of a switching circuit 4R and the blue color difference signal from the demodulator 9 is fed to one input terminal of a switching circuit 4B, respectively. The red and blue color difference signals are also fed together to a matrix circuit 14 that produces a green color difference signal which is then fed to one input terminal of a switching circuit 4G. The burst signal from the burst gate circuit 10 is also fed to a color killer circuit 15 that produces a color killer signal upon the reception of a black and white television signal and supplies the color killer signal to the second band pass amplifier 6 to cut it off.

Figure 2:
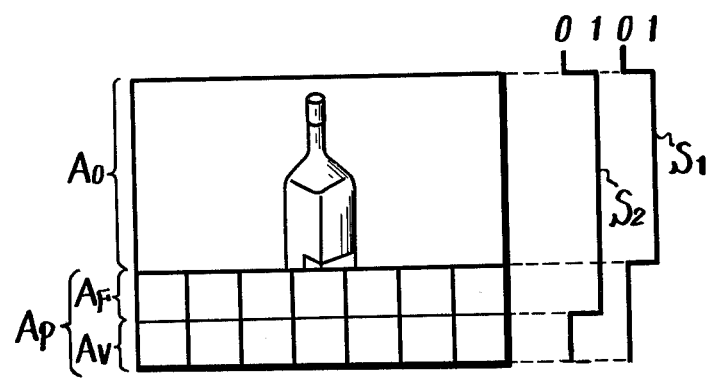
FIGS. 2 to 6, inclusive, are diagrams used for explaining the operation of this system shown in FIG. 1.
Figure 3:
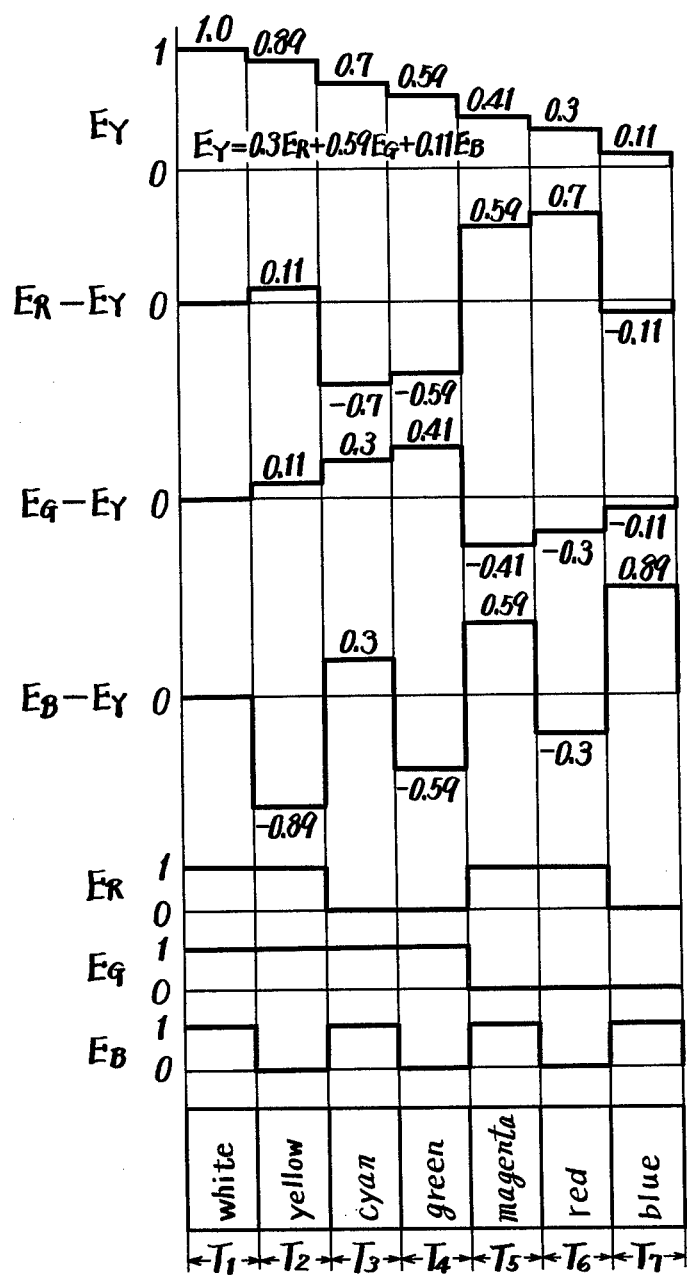

The output signal from the first band pass amplifier 2 is fed also to horizontal and vertical synchronizing signal separator circuits 16 and 17 which produce horizontal and vertical synchronizing signals $P_H$ and $P_V$, respectively. The horizontal and vertical synchronizing signals $P_H$ and $P_V$ are fed to a switching signal generating circuit 18 to control the production of a switching signal $S_1$. This switching signal $S_1$ has an amplitude or value, designated as "1" during a time interval in each field within which an electron beam in the picture tube of the receiver scans an area $A_O$ of the picture tubes screen. The screen is depicted in FIG. 2, and it will be seen that the area $A_O$ covers more than half of the entire television picture area. The signal $S_1$ has a value designated as "0" during a time interval within which the electron beam in the picture tube scans a band area $A_P$ that extends horizontally under the upper area $A_O$, as shown in FIG. 2. The horizontal synchronizing signal $P_H$ and switching signal $S_1$ are fed together to a color bar signal generating circuit 19 which then produces three signals $E_Y$, $E_R - E_Y$ and $E_B - E_Y$ which are to be used as reference signals. These signals $E_Y$, $E_R - E_Y$ and $E_B - E_Y$ are produced during the time interval within which the value of the switching signal $S_1$ is "0", that is, during the time the beam scans the reference color area $A_P$, and voltages of these reference signals have different values during seven time intervals $T_1$ to $T_7$ of each horizontal scanning time interval as shown in FIG. 3.

The signal $E_R - E_Y$ from the color bar signal generating circuit 19 is fed through a switching circuit 20 to an amplifier circuit 21 and to a variable gain amplifier circuit 22 separately. The output signals from the amplifier circuits 21 and 22 are connected to the two input terminals of a single-pole double-throw switching circuit 23, respectively. Similarly, the signal $E_B - E_Y$ from the generating circuit 19 is fed through a switching circuit 24 to an amplifier circuit 25 and a variable gain amplifier circuit 26 separately, and the output signals of the amplifiers 24 and 25 are connected to the two input terminals of a switching circuit 27, respectively.

The horizontal synchronizing signal $P_H$ and the switching signal $S_1$ are also supplied to another switching signal generating circuit 28 which then produces a switching signal $S_2$. This switching signal $S_2$ has the value "1" during the time interval within which the beam scans a fixed reference color area $A_F$ of the upper half of the area $A_P$ but "0" during the time interval within which the beam scans a variable reference color area $A_V$ of the lower half of the area AP. The switching signal $S_2$ is fed to the switching circuits 23 and 27 to cause them to be switched to the states shown in FIG. 1 during the time intervals when the signal $S_2$ has the value "1" but to be switched to the opposite states during the time intervals when the signal $S_2$ has the value "0" respectively. The signal $E_Y$ from the generating circuit 19 is fed through an amplifier circuit 29 to the other input terminal of the switching circuit 4Y from the terminal to which the amplifier 3 is connected. The output signal from the switching circuit 23 is supplied to the other input terminal of the switching circuit 4R from the terminal to which the R-Y signal from the demodulator 8 is connected, and the output signal from the switching circuit 27 is supplied to the other input terminal of the switching circuit 4B from the terminal to which the B-Y signal from the demodulator 9 is connected. The output signals from the switching circuits 23 and 27 are supplied to a matrix circuit 30 which produces a signal corresponding to the green color difference signal when the signal from the switching circuit 23 is the red color difference signal and the signal from the switching circuit 27 is the blue color difference signal. This signal from the matrix circuit 30 is fed to the other input terminal of the switching circuit 4G from the terminal to which the output of the matrix circuit 14 is connected.

The switching signal $S_1$ from the generating circuit 18 is applied through a switching circuit 31 to the switching circuits 4Y, 4R, 4G and 4B to cause them to have the states of conductivity shown in FIG. 1 during each time interval when the value of the signal $S_1$ is "1" but to the opposite states during each time interval when the value of the signal $S_1$ is "0". It is assumed that the output signal from the switching circuit 4Y is the luminance signal and those from the switching circuits 4R, 4G and 4B are red, green and blue color difference signals. These four signals are then fed to a matrix circuit 32 which that produces the primary red (R), green (G) and blue (B) color signals. These primary color signals are supplied to the respective cathodes of a color cathode ray tube (not shown). In this case, the gains of the amplifiers 29, 21 and 25 have the same constant value, so that from the amplifiers 29, 21 and 25 are produced the signals $E_Y$, $E_R - E_Y$ and $E_B - E_Y$, unchanged, with the level relation thereamong shown in FIG. 3 during the time interval within which the area $A_P$ shown in FIG. 2 is scanned.

If the arm of a double-throw switch 33 is switched to its contact M as shown in FIG. 1 to supply the voltage from a manually operated control voltage source 34 to the variable phase shifter 7 for hue adjustment and to the variable gain amplifiers 22 and 26, the phase-shifting amount of the phase shifter 7 and the amplifying gains of the amplifiers 22 and 26 are varied in ganged relation. In this case, the gains of the amplifiers 22 and 26 are controlled in complementary manner by the manual adjustment to change the hue in the area $A_V$ along with the hue variation in the television picture area $A_O$.

Figure 4A:
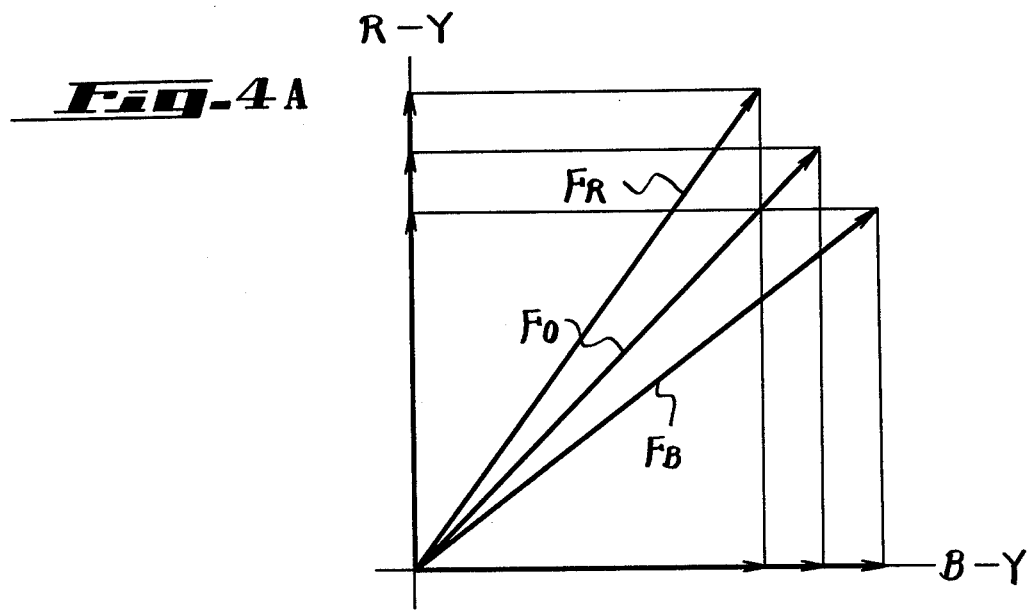
Figure 4B:
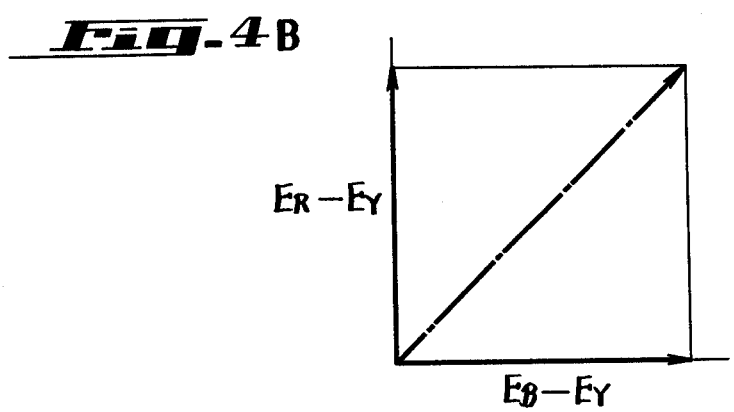
Figure 4C:
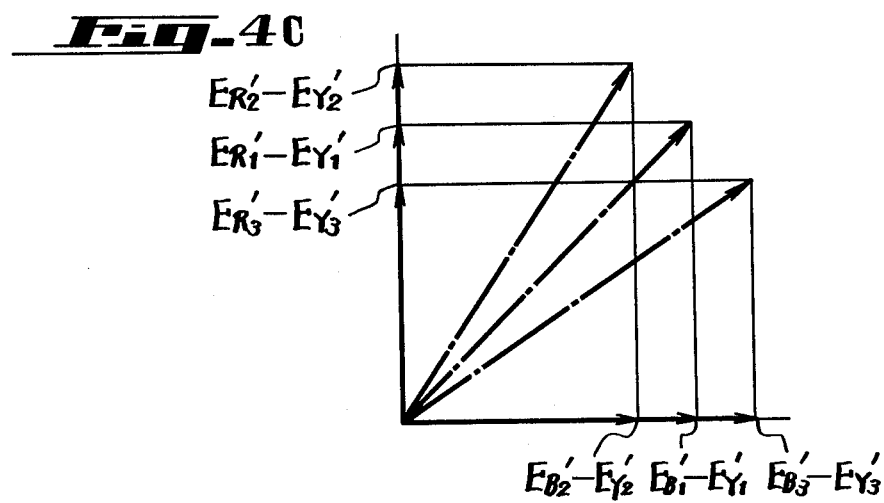

When the phase shift produced by the phase shifter 7 is set at a predetermined value so as to set the hue at an optimum value, as shown by the vector $F_O$ in FIG. 4A, the amplifying gain of the amplifiers 22 and 26 becomes equal to that of the amplifiers 29, 21 and 25 and hence signals $E_{R1}' - E_{Y1}'$ and $E_{B1}' - E_{Y1}'$ become equal to the signals $E_R - E_Y$ and $E_B - E_Y$ from the amplifiers 21 and 25, respectively, as shown in FIGS. 4B and 4C. When the phase shift produced by the phase shifter 7 is changed to cause the picture to take on a hue in which the red color is emphasized as indicated by the vector $F_R$ in FIG. 4A, the gain of the amplifier 22 becomes higher than that of the amplifier 21 with the result that the amplitude of a signal $E_{R2}' - E_{Y2}'$ from the amplifier 22 becomes higher than the amplitude of the signal $E_R - E_Y$ from the amplifier 21. At the same time, the gain of the amplifier 26 becomes lower than that of the amplifier 25 with the result that the amplitude of a signal $E_{B2}' - E_{Y2}'$ from the amplifier 26 becomes smaller than the amplitude of the signal $E_B - E_Y$ from the amplifier 25. On the contrary, when the phase shift produced by the phase shifter 7 is changed to cause the picture to take on a hue in which that the blue color is emphasized as indicated by $F_B$ in FIG. 4A. Under that condition the amplifying gain of the amplifier 22 becomes lower than that of the amplifier 21 with the result that the amplitude of a signal $E_{R3}' - E_{Y3}'$ from the amplifier 22 becomes smaller than the amplitude of the signal $E_R - E_Y$ from the amplifier 21 and the amplifying gain of the amplifier 26 becomes higher than that of the amplifier 25 with the result that the amplitude of a signal $E_{B3}' - E_{Y3}'$ from the amplifier 26 becomes greater than the amplitude of a signal $E_B - E_Y$ from the amplifier 25.

The switching circuits 4Y, 4R, 4G and 4B are in the states shown in FIG. 1 during each time interval within which the beam scans the television picture area $A_O$ in FIG. 2, so that a received television picture is produced in the area $A_O$ and its hue can be adjusted by changing the voltage of the voltage source 34 and hence changing the phase-shifting amount of the phase shifter 7. During the time interval within which the upper half area $A_F$ of the reference color area $A_P$ in FIG. 2 is scanned, the switching circuits 23 and 27 remain in the states shown in FIG. 1, but the switching circuits 4Y, 4R, 4G and 4B are switched to the states opposite those shown in FIG. 1. As a result, in the area $A_F$ there is displayed a color bar of a fixed hue in which white, yellow, cyan, green, magenta, red and blue colors are arranged sequentially in the horizontal direction by the signals $E_Y$, $E_R - E_Y$ and $E_B - E_Y$ shown in FIG. 3. During each time interval within which the lower area $A_V$ of the area $A_P$ is scanned, all of the switching circuits 23, 27, 4Y, 4R, 4G and 4B are switched to the states opposite those shown in FIG. 1. As a result, a color bar is displayed on the area $A_V$ by the signals $E_Y$, $E_R' - E_Y'$ and $E_B' - E_Y'$. In this case when the hue is adjusted by changing the voltage of the voltage source 34, the hues of the respective portions of the color bar in the horizontal direction are varied in response to the changing of the voltage of the voltage source 34. When the amplitudes of the signals $E_R' - E_Y'$ and $E_B' - E_Y'$ become equal to the amplitudes of the signals $E_R - E_Y$ and $E_B - E_Y$, respectively, and the hue of the color bar displayed in the area $A_V$ becomes the same as that of the color bar in the area $A_F$, the hue of the received color television picture is optimum.

Therefore, if the voltage source 34 is adjusted so as to make the hue of the color bar in the area $A_V$ the same as that of the color bar on the area $A_F$, the hue of the received color television picture can be made optimum.

Figure 5:
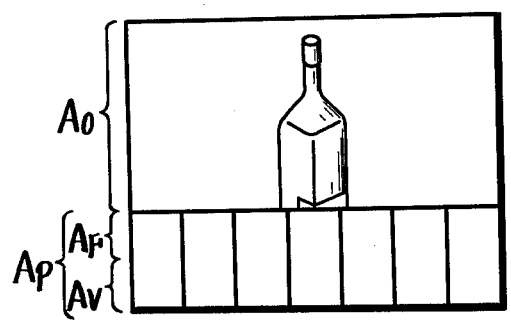
Figure 6:
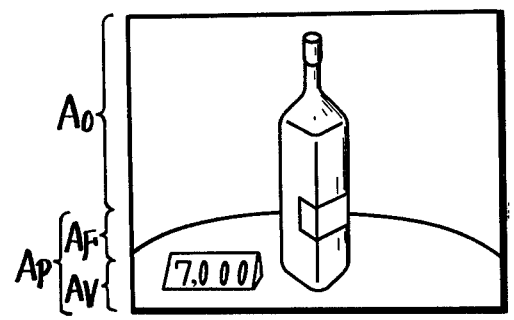

When a black and white television signal is received, the switching circuits 20 and 24 are made non-conductive by the color killer signal from the color killer circuit 15. Thus, it is possible for a gray scale to be displayed on the area $A_P$ using only the signal $E_Y$, as shown on FIG. 5. Or the switching signal generating circuit 18 may be controlled by the color killer signal, if the latter is connected to the circuit 18, as indicated by the dotted line in FIG. 1, to cause the switching signal $S_1$ therefrom to have the value "1" always, with the result that the switching circuits 4Y, 4R, 4G and 4B are switched to the states shown in FIG. 1 and a received black and white television picture is displayed over the whole area of the picture tube, as shown in FIG. 6.

After the above hue adjustment has been achieved, for example by switching a switching circuit 35 from its contact C to its other contact F, the switching circuit 31 can be made non-conductive so that the switching circuits 4Y, 4R, 4G and 4B will be switched to the states shown in FIG. 1, respectively, to produce a received color television picture that covers the screen.

The hue control knob and the switch 31 may be ganged together to change the switch 31 automatically. That is, operation of the hue control is electrically or mechanically detected and the color bar is displayed only when the hue control is varied.

In addition to the manual hue adjustment achieved by changing the switch 33 to its manual contact M as described above, the switch 33 may be changed to its auto contact A to carry out the hue adjustment automatically. In this case, for example, the signal $E_B - E_Y$ from the amplifier 25 and the signal $E_B' - E_Y'$ from the amplifier 26 may be supplied to a level comparator 36 to be level-compared. The compared output signal from this level comparator 36 is applied to an amplifier 37 and, from the output terminal of the amplifier to the conact A of the switch 33 an thence to the phase shifter 7 and the amplifiers 22 equal to that of the amplifiers 21, so that 25 and the signals $E_R' - E_Y'$ and $E_B' - E_Y'$ from the amplifiers 22 and 26 become equal to the signals $E_R - E_Y$ and $E_B - E_Y$ from the amplifiers 21 and 25 and hence the phase-shifting amount of the phase shifter 7 is set at a value that makes the hue optimum. In this case, when the switch 35 is switched to its contact C to make the switching circuit 31 conductive, the color bars displayed in the areas $A_F$ and $A_V$ have the same hue, but when the switch 35 is switched to its other contact F to make the switching circuit 31 non-conductive, the hue adjustment is carried out automatically but no color bar is displayed.

FIG. 7 shows another example of the invention in which the color bar signal is used to modulate a carrier and this modulated signal is demodulated by the demodulators that demodulate the chrominance signal. In FIG. 7, the parts corresponding to those of FIG. 1 are indicated by the same reference numerals and symbols and their detailed description will be omitted.

In the example of FIG. 7, the chrominance signal from the second band pass amplifier 6 is fed to one input terminal of a switching circuit 4C. The continuous wave signal from the oscillator 11 is fed, without modification, to one input terminal of a switching circuit 38 and through the phase shifter 7 for hue adjustment to the other input terminal. The switching signal $S_2$ from the switching signal generating circuit 28 is fed to the switching circuit 38 to place the latter in the state shown in FIG. 7 during each time interval that the value of the signal $S_2$ is "1". The circuit 38 is switched to the state opposite to that shown in the figure during each time interval in which the value of the signal $S_2$ is "0". The signals $E_R - E_Y$ and $E_B - E_Y$ from the color bar signal generating circuit 19 are fed to modulators 39 and 40, respectively. These modulators are also supplied with the continuous wave signal from the switching circuit 38 through phase shifters 41 and 42, respectively, to be carrier-suppressed-amplitude-modulated by the signals $E_R - E_Y$ and $E_B - E_Y$ in the modulators 39 and 40 with different axes of 90°. The modulated signals are then fed to an adder 43 to be combined. The combined signal from the adder 43 is fed through an amplifier 44 and a switching circuit 45 to the other input terminal of the switching circuit 4C. The switching signal $S_1$ from the switching signal generating circuit 18 is fed through the switching circuit 31 to the switching circuit 4C to switch the latter to the state shown in the figure during the time interval within which the signal $S_1$ is "1" to switch it to the state opposite to that shown in the figure during the time interval within which the signal $S_1$ is "0". The signal from the switching circuit 4C is fed to the demodulators 8 and 9 which are also supplied with the continuous wave signal from the phase shifter 7 through the phase shifters 12 and 13 as demodulating signals having the phase of R-Y and B-Y axes. The demodulated signals from the demodulators 8 and 9 and the output signal of the matrix circuit 14 are fed, unchanged, to the matrix circuit 32. The luminance signal and the signal $E_Y$ from the color bar signal generating circuit 19 are treated in the same manner as in the example of FIG. 1.

In the example of FIG. 7, the phase-shifting amounts of the phase shifters 12 and 41 are selected to be equal, those of the phase shifters 13 and 42 are also selected to be equal and the phase-shifting amount of the phase shifter 7 is selected to be zero when the hue is optimum.

Accordingly, during the time interval within which the beam scans the television picture area $A_O$, the switching circuits 4Y, 4C and 38 are in the states shown in FIG. 7, so that the received television picture is produced in the area $A_O$ and its hue can be adjusted by changing the voltage of the control voltage source 34 to change the phase-shifting amount of the phase shifter 7. During the time interval within which the upper area $A_F$ of the area $A_P$ is scanned, the switching circuits 4Y and 4C are switched to the states opposite to those shown in FIG. 7, but the switching circuit 38 remains in the state shown in FIG. 7. Because the phase shifter 7 supplies the same signal to all four of the fixed phase shifters 12, 13, 41, and 42 during the scanning of area $A_F$, the modulating axes of the modulators 39 and 40 for the signals $E_R - E_Y$ and $E_B - E_Y$ from the color bar signal generating circuit 19 are same as those of the demodulators 8 and 9. As a result, the demodulators 8 and 9 reproduce the signals $E_R - E_Y$ and $E_B - E_Y$ from the modulated carriers in the same amplitude relationship that those signals had when produced by the color bar signal generating circuit 19. Thus, a color bar of fixed hue is displayed in the area $A_F$. During the time interval within which the lower half area $A_V$ of the area $A_P$ is scanned, all three of the switching circuits 4Y, 4C and 38 are switched to states opposide to those shown in FIG. 7. The phase of the carrier signal at the output of the switch 38 is shifted by the fixed phase shifters 41 and 42 to determine the modulating axes of the modulators 39 and 40 for the signals $E_R - E_Y$ and $E_B - E_Y$ from the color bar signal generating circuit 19. Thus these axes are constant, but the demodulating axes of the demodulators 8 and 9 are varied in accordance with the phase-shifting amount of the phase shifter 7. Therefore, a color bar is displayed in the area $A_V$ but the hues of the respective portions of the color bar separated in the horizontal direction are varied in ganged relation with the hue adjustment by the voltage source 34. When the phase-shifting amount of the phase shifter 7 becomes zero, the demodulating axes of the demodulators 8 and 9 become coincident with the modulating axes of the modulators 39 and 40 and hence the hue of the color bar displayed in the area $A_V$ becomes the same as that of the color bar in the area $A_F$, so that the hue of the received color television picture is optimum.

In the circuit of FIG. 7, when a black and white television signal is received, the switching circuit 45 is made non-conductive by the color killer signal from the color killer circuit 15. Thus, it is possible for a gray scale to be displayed in the area $A_P$ with only the signal $E_Y$. Alternatively, switching signal generating circuit 18 may be controlled so as to make the switching signal $S_1$ have the value "1" always and to switch the switching circuits 4Y and 4C to the states shown in FIG. 7 so that a received television picture will be displayed on whole the screen.

As described above, according to the present invention since two kinds of reference colors are used, the hue of a picture can be adjusted simply and easily, or made optimum automatically.

With the invention it may be possible that the colors to be compared are not the color bar signal but a special reference color. In that case, the reference color may be displayed in a corner of the picture screen.

It may be apparent that many modifications and variations could be effected by one skilled in the art without departing from the true scope of the novel concepts of the invention so that the scope of the invention should be determined by the following claims.

We claim as our invention:

1. A color television receiver comprising:
a cathode ray tube including a screen emiting light in a plurality of colors;
circuit means responsive to received color television signals and connected to said tube to produce a color television picture on said screen;
first hue control means connected to said circuit means to vary the hue of said picture;
first generating means to generate reference signals of predetermined relationship, said first generating means being connected to said circuit means to cause a predetermined area of said screen to produce light of a predetermined hue; and
second generating means to generate signals of variable relationship, said second generating means being connected to said circuit means to cause a different predetermined area of said screen to produce light, said second generating means including second hue control means to vary the hue of said light produced in said different area simultaneously with the control of the hue of said picture, said second hue control means having first and second gain controlled amplifiers the gains of which are controlled complementarily with respect to each other in response to variation of said first hue control means.

2. A color television receiver according to claim 1 wherein said first hue control means comprises a phase shifter connected in series with said circuit, and the color television signals pass therethrough as modulated signals, said phase shifter being responsive to a control voltage applied thereto to control the amount of phase shift of the color television signals passing through the phase shifter; a source of voltage of controllable amplitude; and means connecting said source to said phase shifter to control the phase shifting operation thereof.

3. A color television receiver according to claim 2 in which said source of voltage comprises a manually controllable direct voltage source.

4. A color television receiver according to claim 2 in which said source of voltage comprises a level comparator connected to terminals of said first and second generating means to compare the levels of voltages therefrom; a connection from said level comparator to said phase shifter to control the amount of phase shift of the color television signals passing therethrough; and a connection from said level comparator to said gain controlled amplifiers to maintain a predetermined relationship between the reference signals generated by said first generating means and the hue of said picture.

5. A color television receiver according to claim 2 in which said circuit means comprises input means to receive chrominance and luminance signals, chrominance signal demodulating circuits to demodulate said chrominance signals to produce color difference signals, a matrix circuit to combine color difference signals and luminance signals to produce color-separated signals, and switching circuit means to connect said matrix circuit selectively to said demodulating circuits and said means to receive the luminance signals or to said first and second generating means, said phase shifter connecting said means to receive the chrominance signals to said demodulator circuits, said first and second generating means comprising a common generating circuit to generate color bar color difference signals and related luminance signals, said first generating means further comprising fixed amplification circuits connecting the color bar color difference signals and related luminance signals from said common generating circuit to said switching circuit means, and said second generating means comprising variable amplification circuits connecting the color bar difference signals to said switching circuit means.

6. A color television receiver comprising:
a cathode ray tube including a screen emitting light in a plurality of colors;
circuit means responsive to received color television signals and connected to said tube to produce a color television picture on said screen;
first hue control means connected to said circuit means to vary the hue of said picture;
first generating means to generate reference signals of predetermined relationship, said first generating means being connected to said circuit means to cause a predetermined area of said screen to produce light of a predetermined hue; and
second generating means to generate signals of variable relationship, said second generating means being connected to said circuit means to cause a different predetermined area of said screen to produce light, said second generating means including second hue control means to vary the hue of said light produced in said different area simultaneously with the control of the hue of said picture; and in which said circuit means includes demodulator means to demodulate chrominance signals, said first hue control means includes a phase shifter the amount of phase shift of which is controlled by a control voltage, said phase shifter is connected to said demodulator means to supply a demodulating carrier thereto at a controllable phase, and said first and second generating means include modulating circuit means and a common color difference and luminance signal generating circuit connected to said modulating circuit means to produce modulated chrominance signals.

7. A color television receiver according to claim 6 comprising a source of oscillations synchronized by a received burst signal connected to said phase shifter to supply the carrier signal thereto to be phase shifted thereby, said receiver further comprising a double-throw switching circuit comprising a first input terminal connected to said source of oscillations to receive the carrier signals therefrom at a fixed phase, a second input terminal connected to said phase shifter to receive the carrier signals therefrom at a controllable phase, and an output terminal selectively connectable to either of said input terminals of said switching circuit and connected to said modulating circuit means to supply the carrier signal thereto at the same phase at which the carrier signal is supplied to said demodulator means when light of the predetermined hue is to be produced and to supply the carrier signal at fixed phase from the output of said oscillator to said modulating circuit means when the light of variable hue is to be produced.

* * * * *